United States Patent
Curtis et al.

(10) Patent No.: US 8,972,985 B2
(45) Date of Patent: Mar. 3, 2015

(54) HYPERVISOR-BASED STACK PRE-FETCH CACHE

(75) Inventors: Paul M. Curtis, Sudbury, MA (US); Alexander Ferguson, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 13/480,533

(22) Filed: May 25, 2012

(65) Prior Publication Data

US 2013/0318523 A1 Nov. 28, 2013

(51) Int. Cl.
*G06F 9/455* (2006.01)

(52) U.S. Cl.
USPC ............................................................ 718/1

(58) Field of Classification Search
None
See application file for complete search history.

(56) References Cited

U.S. PATENT DOCUMENTS

| | | | |
|---|---|---|---|
| 7,814,287 B2 * | 10/2010 | Pratt | 711/163 |
| 2010/0250895 A1 * | 9/2010 | Adams et al. | 711/207 |

* cited by examiner

*Primary Examiner* — Mengyao Zhe

(57) ABSTRACT

A hypervisor, associated with a device, receives guest operating system code that includes an instruction to switch to a new stack provided in hardware associated with the device. The hypervisor provides, to a guest page table associated with the hypervisor, a query for writable pages provided in proximity to the new stack, and receives, from the guest page table and based on the query, the writable pages provided in proximity to the new stack. The hypervisor provides test instructions to the new stack in order to determine whether one or more faults occur, and switches from a current stack to the new stack when no faults occur based on the test instructions.

20 Claims, 7 Drawing Sheets

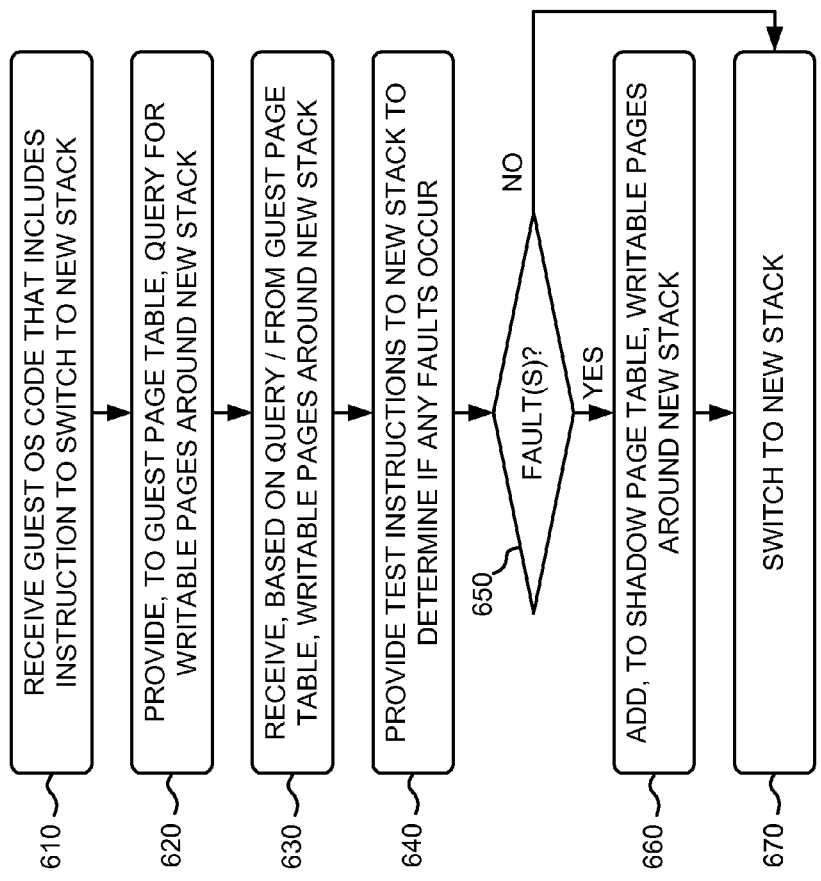

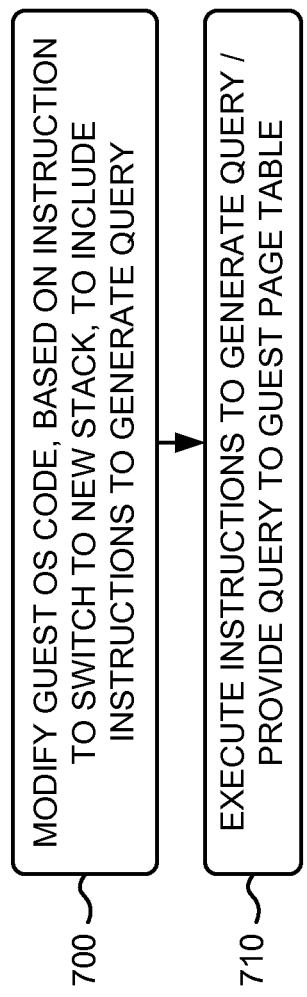

HYPERVISOR-BASED STACK PRE-FETCH CACHE

BACKGROUND

System virtualization is the abstraction and pooling of resources on a platform. The abstraction decouples software and hardware and enables multiple operating systems to execute concurrently on a single physical platform without interfering with each other. To permit operating systems to execute on the same physical platform, a platform layer implemented in software decouples the operating system from the underlying hardware. This platform layer is referred to as a hypervisor and the operating system is referred to as a guest operating system.

To provide protection and isolation between guest operating systems and the hypervisor, the hypervisor controls address translation on the hardware (e.g., a processor) when guest operating systems are active. This level of address translation maps the guest operating system's view of the physical memory of the processor to the hypervisor's view of the physical memory. Software-based techniques maintain a shadow version of a page table (e.g., a data structure used by a virtual memory system in an operating system to store a mapping between virtual addresses and physical addresses) derived from a guest page table. The shadow version of the page table is referred to as a shadow page table. The shadow page table is managed by the hypervisor. When a guest operating system is active, the shadow page table is used to perform address translation. The shadow page table is not visible to the guest operating system, and the guest operating system is forced to use the guest page table to perform address translation.

To maintain a valid shadow page table, the hypervisor keeps track of the state of the guest page table. This includes modifications by the guest operating system to add or remove translations in the guest page table, guest operating system and/or hypervisor induced page faults (e.g., referencing memory that cannot be referenced), accessed and dirty bits in the shadow page table, etc. The hypervisor ensures that the guest page table is mapped correctly to the shadow page table, especially when a guest operating system is switching from one stack to another stack (e.g., a last in, first out (LIFO) abstract data type and linear data structure). Otherwise, the guest operating system will experience a page fault when attempting to switch to the other stack.

One method to ensure that the guest operating system does not experience a page fault may include retrieving a new stack before every stack pointer changing instruction. However, such a method may incur high overhead due to the high frequency of stack push and pop instructions. Another method may include retrieving a new stack before every stack load instruction (e.g., a move instruction, a leave instruction, an exchange instruction, etc.). This method may address the problems associated with the stack push and pop instructions, but experiences difficulties when the stacks are multiple pages. A problem with multiple page stacks is that all of the current stack pages may need to be mapped. This is difficult for the hypervisor to accomplish because at the time of execution by the guest operating system, the hypervisor is unaware, given a new stack pointer, which pages are part of the stack. For example, the hypervisor may know that the new stack pointer is part of the stack but may not know whether a previous page or a next page is part of the stack. However, all pages of a given stack may need to be mapped by the hypervisor for stack push and pop instructions to execute unchecked.

BRIEF DESCRIPTION OF THE DRAWINGS

FIGS. 6 and 7 are flow charts of an example process for providing a hypervisor-based pre-fetch cache according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a hypervisor-based pre-fetch cache that enables a multiple page stack to be properly mapped to a shadow page table. For example, for a given stack address, the pre-fetch cache may return how many pages are safe to reference before and after a new stack pointer. The pre-fetch cache may not return an actual size of the stack, but may return information about whether pages before and after the new stack pointer are mappable. If the pages before and after the new stack pointer are mappable, the hypervisor may know that the pages may be quickly and easily pre-fetched.

Figure 1:
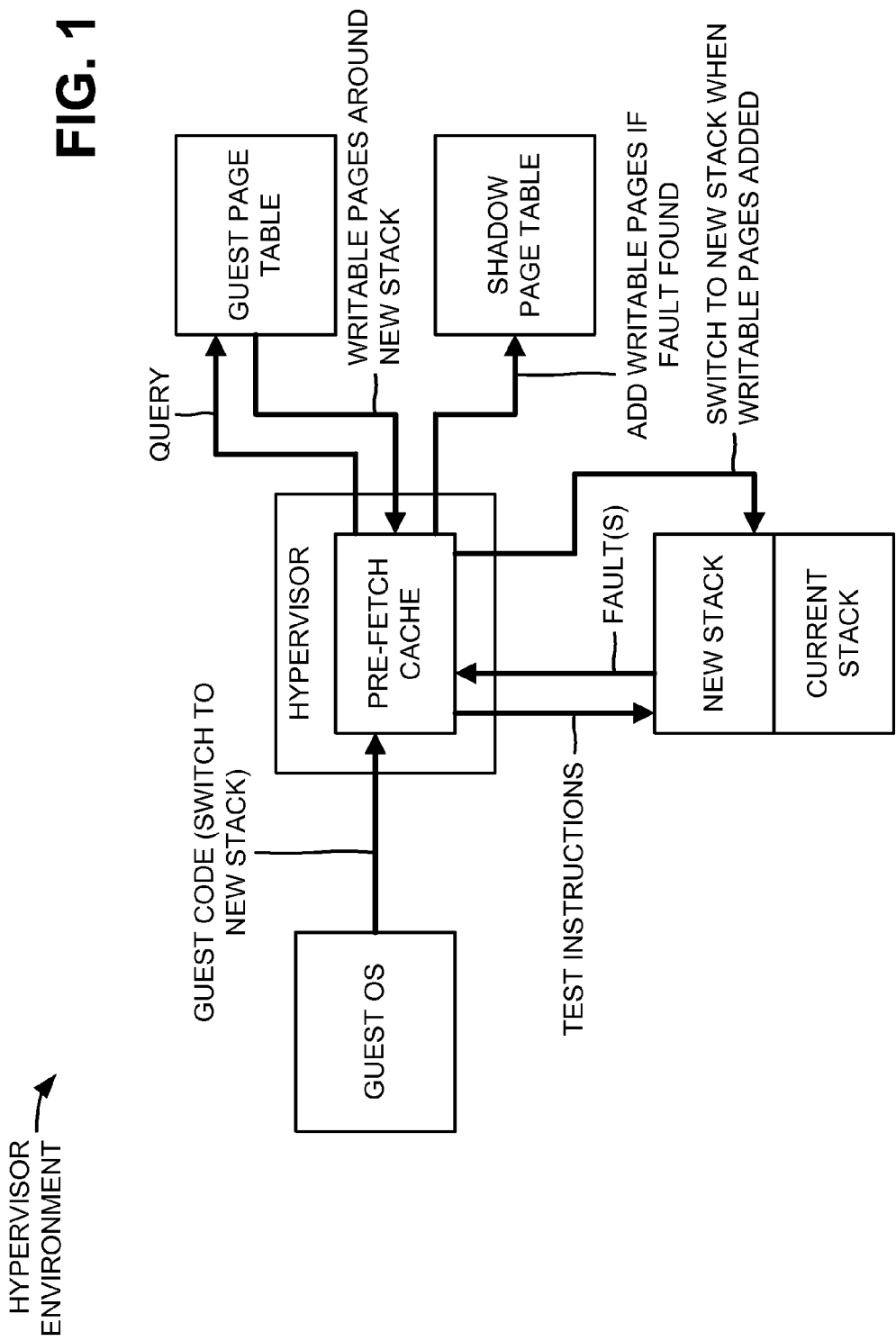
FIG. 1 is a diagram of an overview of an example implementation described herein.

FIG. 1 is a diagram of an overview of an example implementation described herein. As shown, a hypervisor environment may be provided in a computation and communication device, such as a radiotelephone, a personal communications system (PCS) terminal, a personal digital assistant (PDA), a laptop computer, a tablet computer, a desktop computer, a workstation computer, or other types of computation and communication devices. The hypervisor environment may include a guest operating system, a hypervisor with a pre-fetch cache, a guest page table, a shadow page table, a new stack, and a current stack.

The guest operating system may include a secondary operating system that is installed in the hypervisor environment in addition to a host operating system (not shown in FIG. 1). The guest operating system may include a Microsoft Windows Desktop operating system, a Microsoft Windows Server operating system, a Linux operating system, etc. The hypervisor may provide hardware virtualization techniques that allow multiple operating systems (e.g., guest operating systems) to execute concurrently on a host computer. The hypervisor may present to the guest operating systems a virtual operating platform, and may manage the execution of the guest operating systems. The pre-fetch cache may enable a multiple page stack, such as the new stack, to be properly mapped to the shadow page table.

The guest page table may include a data structure that stores a mapping between virtual addresses and physical addresses. The virtual addresses may include addresses unique to an accessing process and/or application. The physical addresses may include addresses unique to hardware. The shadow page table may include a shadow version of a page table derived from the guest page table. The new stack may include one or more instructions to be executed on behalf of the guest operating system. The current stack may include one or more instructions currently being executed on behalf of the guest operating system.

As further shown in FIG. 1, the pre-fetch cache may receive guest code from the guest operating system. The guest code may include one or more instructions to be executed by a hypervisor on behalf of the guest operating system, and may include an instruction to switch from the current stack to the new stack. Based on receipt of the guest code, the pre-fetch cache may provide a query to the guest page table. The query may include a request for writable pages provided around or in proximity to the new stack. In one example, the pre-fetch cache may insert instructions, in the guest code, that cause the guest code to generate the query. The guest page table may receive the query, and may identify, in the guest page table, writable pages provided around the new stack. The guest page table may provide the writable pages to the pre-fetch cache, and the pre-fetch cache may receive the writable pages.

Based on the writable pages, the pre-fetch cache may provide test instructions to the new stack in order to determine whether any faults occur prior to switching to the new stack. The test instructions may reference pages associated with the new stack and may return one or more faults if the referenced pages are not writable. If the test instructions return one or more faults to the pre-fetch cache, the pre-fetch cache may add, to the shadow page table, the writable pages provided around the new stack. After the writable pages are added to the shadow page table, the pre-fetch cache may switch from the current stack to the new stack. If the test instructions do not return one or more faults, the pre-fetch cache may switch from the current stack to the new stack without adding the writable pages to the shadow page table. In such a situation, the pre-fetch cache may switch to the new stack since the writable pages of the new stack are already provided in the shadow page table.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
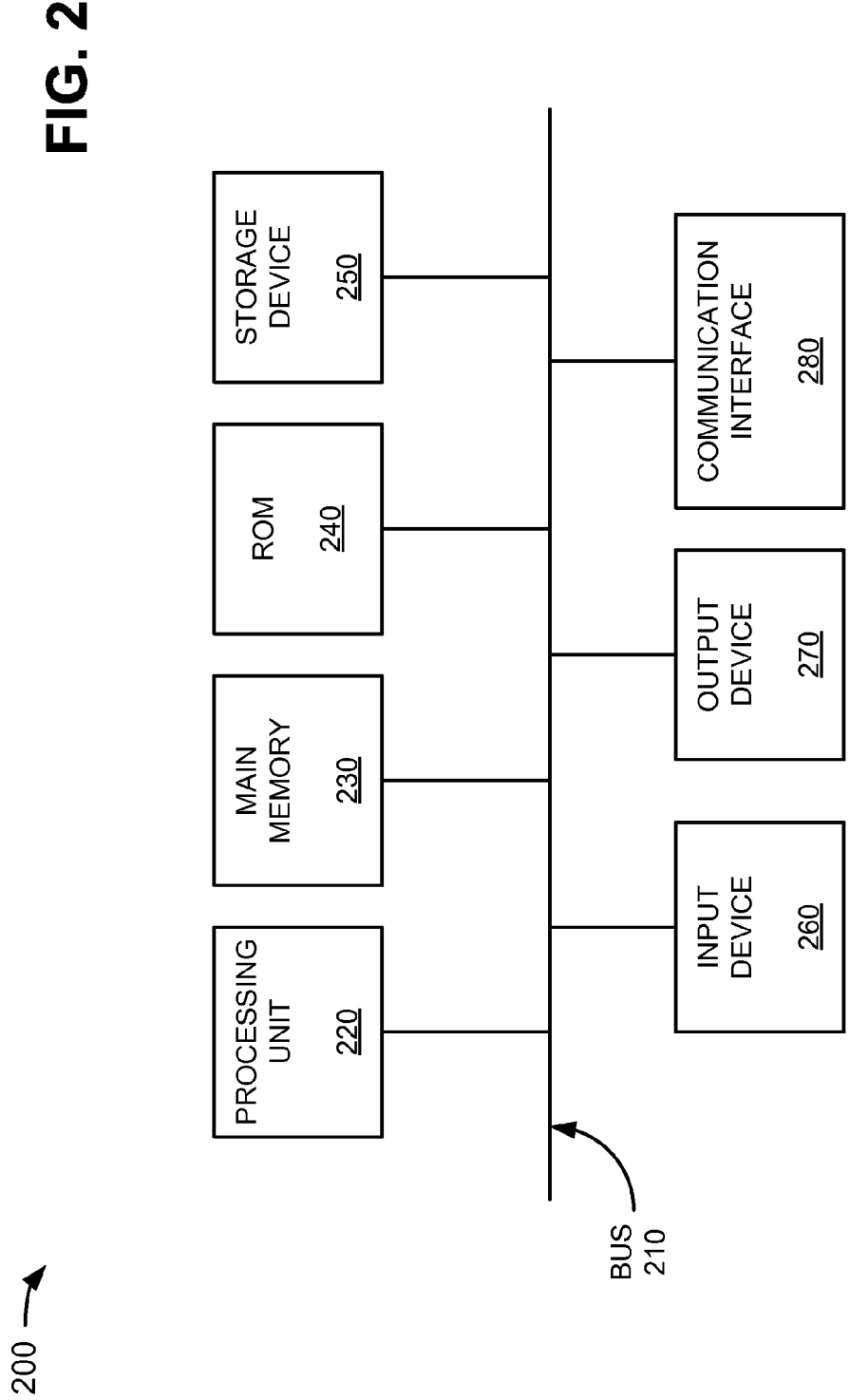
FIG. 2 is a diagram of example components of a device that may contain a hypervisor environment depicted in FIG. 1.

FIG. 2 is a diagram of example components of a device 200 that may contain the hypervisor environment depicted in FIG. 1. As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
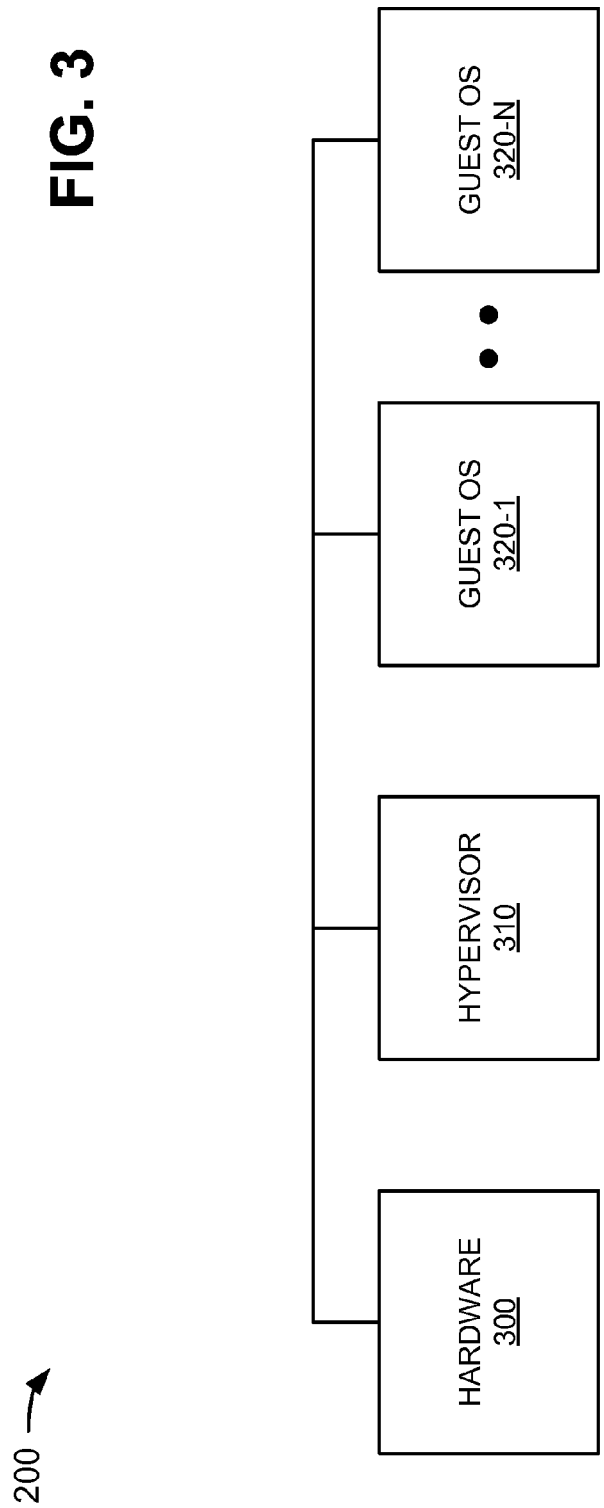
FIG. 3 is a diagram of example functional components of the device of FIG. 2.

FIG. 3 is a diagram of example functional components of device 200. In one implementation, the functions described in connection with FIG. 3 may be performed by one or more components of device 200 (shown in FIG. 2) or by one or more devices 200. As shown in FIG. 3, device 200 may include hardware 300, a hypervisor 310, and multiple guest operating systems (OSs) 320-1 through 320-N (collectively referred to herein as "guest operating systems 320," and, in some instances, singularly as "guest operating system 320").

Hardware 300 may include one or more components of device 200 shown in FIG. 2, such as bus 210, processing unit 220, main memory 230, ROM 240, storage device 250, input device 260, output device 270, and/or communication interface 280.

Hypervisor 310 may provide hardware virtualization techniques that allow multiple operating systems (e.g., guest operating systems 320) to execute concurrently on device 200. Hypervisor 310 may present a virtual operating platform to guest operating systems 320, and may manage the execution of guest operating systems 320. Multiple instances of a variety of operating systems may share the virtualized hardware resources. Hypervisor 310 may provide an interface to infrastructure as a service (IaaS) provided by device 200. In one example, hypervisor 310 may include a VM VirtualBox hypervisor, available from Oracle Corporation, or other similar hypervisors (e.g., a Xen hypervisor, a Kernel Virtual Machine (KVM) Linux virtualization hypervisor, etc.).

Guest operating system 320 may include a secondary operating system that is installed in device 200 in addition to a host operating system (not shown in FIG. 3). Guest operating system 320 may include a Microsoft Windows Desktop operating system, a Microsoft Windows Server operating system, a Linux operating system, etc. In one example, guest operating system 320 may provide guest code to hypervisor 310. Hypervisor 310 may execute the guest code on behalf of guest operating system 320 and by utilizing hardware 300.

Although FIG. 3 shows example functional components of device 200, in other implementations, device 200 may include fewer functional components, different functional components, differently arranged functional components, or additional functional components than depicted in FIG. 3. Additionally, or alternatively, one or more functional components of device 200 may perform one or more tasks described as being performed by one or more other functional components of device 200.

Figure 4:
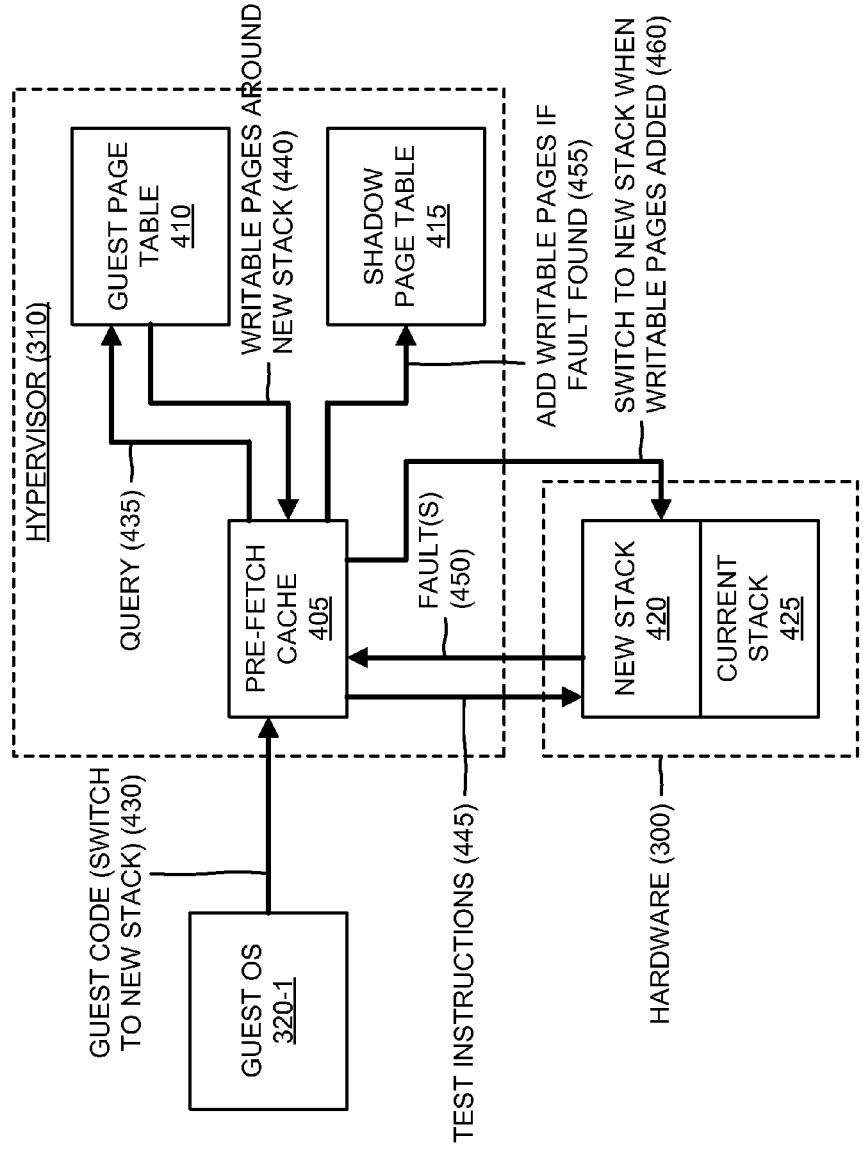
FIG. 4 is a diagram of example operations capable of being performed by the functional components depicted in FIG. 3.

FIG. 4 is a diagram of example operations capable of being performed by the functional components of device 200 (shown in FIG. 3). In one implementation, the functions described in connection with FIG. 4 may be performed by one or more components of device 200 (shown in FIG. 2) or by one or more devices 200. As shown in FIG. 4, device 200 may include hardware 300, hypervisor 310, and guest operating system 320-1. Hardware 300, hypervisor 310, and guest operating system 320-1 may include the features described above in connection with, for example, FIG. 3. As further shown in FIG. 4, hypervisor 310 may include a pre-fetch cache 405, a guest page table 410, and a shadow page table 415. Hardware 300 may include a new stack 420 and a current stack 425.

Pre-fetch cache 405 may enable a multiple page stack, such as new stack 420, to be properly mapped to shadow page table 415. Guest page table 410 may include a data structure (e.g., a table, a database, etc.) that stores a mapping between virtual addresses and physical addresses. The virtual addresses may include addresses unique to an accessing process. The physical addresses may include addresses unique to hardware 300. Shadow page table 415 may include a shadow version of a page table derived from guest page table 410. New stack 420 may include one or more instructions to be executed on behalf of guest operating system 320-1. Current stack 425 may include one or more instructions currently being executed on behalf of guest operating system 320-1.

As further shown in FIG. 4, pre-fetch cache 405 may receive guest code 430 from guest operating system 320-1. Guest code 430 may include one or more instructions to be executed by hypervisor 310 on behalf of guest operating system 320-1, and may include an instruction to switch from current stack 425 to new stack 420. Based on receipt of guest code 430, pre-fetch cache 405 may provide a query 435 to guest page table 410. Query 435 may include a request for a range of writable pages provided around or in proximity to new stack 420. In one example, pre-fetch cache 405 may insert instructions, in guest code 430, that cause guest code 430 to generate query 435 and to provide query 435 to guest page table 410. Pre-fetch cache 405 may execute the instructions in guest code 430 to generate query 435 and to provide query 435 to guest page table 410. Guest page table 410 may receive query 435, and may identify, in guest page table 410, writable pages 440 provided around new stack 420. Writable pages 440 may include a number of pages that are safe to reference (e.g., may be mapped) before and after new stack 420, and information associated with the pages that are safe to reference. Guest page table 410 may provide writable pages 440 to pre-fetch cache 405, and pre-fetch cache 405 may receive writable pages 440.

If writable pages 440 can be mapped before and after new stack 420, pre-fetch cache 405 may determine that writable pages 440 can be quickly and easily pre-fetched. Pre-fetch cache 405 may make this determination by referencing writable pages 440. Pre-fetch cache 405 may reference writable pages 440 by providing test instructions 445 to new stack 420 in order to determine whether any faults occur prior to switching to new stack 420. In one example, test instructions 445 may include an x86 instruction, e.g., a "lock xadd [new stack], eax" instruction where "eax" may be set to zero. Test instructions 445 may reference pages associated with new stack 420 and may return one or more faults 450 if the referenced pages are not writable. If test instructions 445 return one or more faults 450 to pre-fetch cache 405, pre-fetch cache 405 may add, to shadow page table 415, writable pages 440 provided around new stack 420, as indicated by reference number 455. After writable pages 440 are added to shadow page table 415, pre-fetch cache 405 may switch from current stack 425 to new stack 420, as indicated by reference number 460. If test instructions 445 do not return one or more faults 450, pre-fetch cache 405 may switch from current stack 425 to new stack 420 without adding writable pages 440 to shadow page table 415.

In one example implementation, test instructions 445 may reference pages before and after new stack 420, and may catch any faults 450 that cannot be resolved. If a fault 450 cannot be resolved by pre-fetch cache 405, a page associated with the unresolved fault 450 may be deemed an unmappable page. If a page is unmappable, pre-fetch cache 405 may determine the page to not be a stack page and may not pre-fetch the page. Pre-fetch cache 405 may update an entry for new stack 420 with a number of consecutive pages that are mappable around new stack 420 and a page offset from new stack 420 to a beginning of the mappable range. A stack entry in pre-fetch cache 405 may be invalidated when virtual address mappings change for a range covered by the entry. Virtual address changes may be monitored by hypervisor 310. When hypervisor 310 detects a virtual address change, hypervisor 310 may check pre-fetch cache 405 to see if the change affects any of the entries in pre-fetch cache 405. If an entry is affected by the change, hypervisor 310 may invalidate the entry.

Although FIG. 4 shows example operations capable of being performed by functional components of device 200, in other implementations, device 200 may include fewer functional components, different functional components, differently arranged functional components, or additional functional components than depicted in FIG. 4. Additionally, or alternatively, one or more functional components of device 200 may perform one or more tasks described as being performed by one or more other functional components of device 200.

Figure 5:
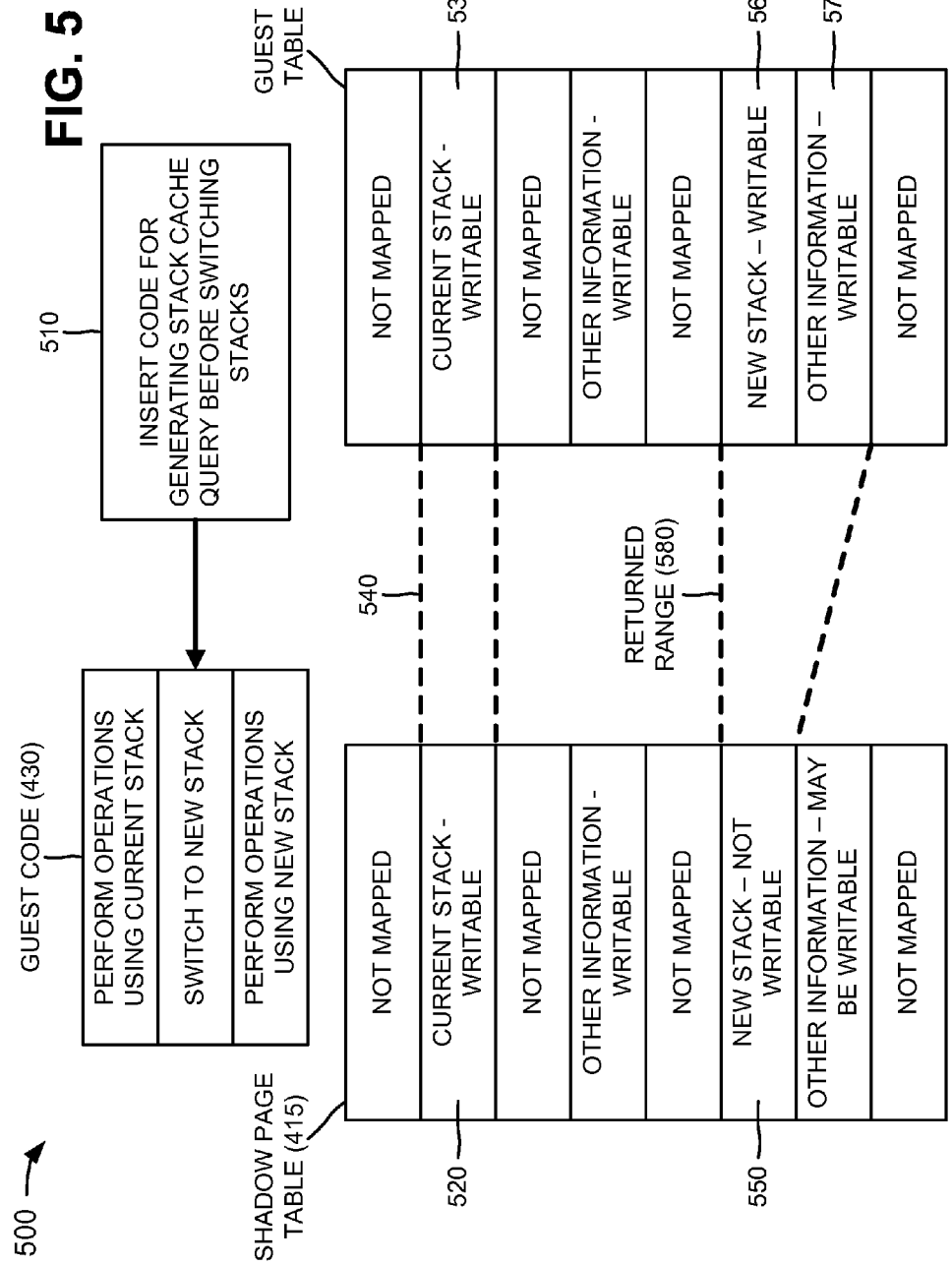
FIG. 5 is a diagram of example operations capable of being performed by the functional components shown in FIGS. 3 and 4.

FIG. 5 is a diagram of example operations 500 capable of being performed by the functional components of device 200 (shown in FIGS. 3 and 4). In one implementation, the functions described in connection with FIG. 5 may be performed by one or more components of device 200 (shown in FIG. 2) or by one or more devices 200. As shown in FIG. 5, device 200 may include guest page table 410, shadow page table 415, and guest code 430. Guest page table 410, shadow page table 415, and guest code 430 may include the features described above in connection with, for example, FIG. 4. Other functional components and/or operations described above in connection with FIG. 4 may also be referenced in the description of FIG. 5.

As further shown in FIG. 5, guest code 430 may include instructions to perform operations using current stack 425, instructions to switch to new stack 420, and instructions to perform operations using new stack 420. Prior to executing the instructions to switch to new stack 420, pre-fetch cache 405 may insert code for generating a stack cache query (e.g., query 435) in guest code 430, as indicated by reference number 510. The inserted code 510 may be provided before the instructions to switch to new stack 420.

Guest page table 410 may include a first page that is not mapped, a writable page associated with current stack 425, a second page that is not mapped, and a first writable page associated with other information. Guest page table 410 may also include a third page that is not mapped, a writable page associated with new stack 420, a second writable page associated with other information, and a fourth page that is not mapped.

Shadow page table 415 may include a first page that is not mapped, a writable page associated with current stack 425, a second page that is not mapped, and a writable page associated with other information. Shadow page table 415 may also include a third page that is not mapped, a not writable page associated with new stack 420, a page that may be writeable and may be associated with other information, and a fourth page that is not mapped.

As further shown in FIG. 5, a reference 520 to current stack 425 may be matched with a reference 530 to current stack 425, as indicated by reference number 540. When guest code 430 reaches the instructions to switch to new stack 420, pre-fetch cache 405 may generate query 435. Query 435 may attempt to identify a range of writable pages surrounding a reference 550 to new stack 420 in shadow page table 415. For example, query 435 may identify, in guest page table 410, a writable page 560 associated with new stack 420 and a second writable page 570 associated with other information. Query 435 may return this range 580 of information (e.g., writable page 560 and second writable page 570) to pre-fetch cache 405.

Pre-fetch cache 405 may generate instructions 445 to reference the pages in range 580, and may determine, before switching to new stack 420, if any faults 450 occur when the pages in range 580 are referenced. Pre-fetch cache 405 may reconcile the information in range 580 with information contained in shadow page table 415. That is, pre-fetch cache 405 may update shadow page table 415 to include the information provided in range 580. Once the information in range 580 is reconciled in shadow page table 415, pre-fetch cache 405 may switch from current stack 425 to new stack 420, and may execute the instructions to perform operations using new stack 420, provided in guest code 430.

Although FIG. 5 shows example operations capable of being performed by functional components of device 200, in other implementations, device 200 may include fewer functional components, different functional components, differently arranged functional components, or additional functional components than depicted in FIG. 5. Additionally, or alternatively, one or more functional components of device 200 may perform one or more tasks described as being performed by one or more other functional components of device 200.

FIGS. 6 and 7 are flow charts of an example process 600 for providing a hypervisor-based pre-fetch cache according to an implementation described herein. In one implementation, process 600 may be performed by device 200. Alternatively, or additionally, some or all of process 600 may be performed by one or more components of device 200, such as by hypervisor 310, pre-fetch cache 405, etc.

As shown in FIG. 6, process 600 may include receiving guest operating system (OS) code that includes an instruction to switch to a new stack (block 610), and providing, to a guest page table, a query for writable pages around the new stack (block 620). For example, in an implementation described above in connection with FIG. 4, pre-fetch cache 405 may receive guest code 430 from guest operating system 320-1. Guest code 430 may include one or more instructions to be executed by hypervisor 310 on behalf of guest operating system 320-1, and may include an instruction to switch from current stack 425 to new stack 420. Based on receipt of guest code 430, pre-fetch cache 405 may provide query 435 to guest page table 410. Query 435 may include a request for a range of writable pages provided around new stack 420. In one example, pre-fetch cache 405 may insert instructions, in guest code 430, that cause guest code 430 to generate query 435.

As further shown in FIG. 6, process 600 may include receiving, from the guest page table and based on the query, writable pages provided around the new stack (block 630), and providing test instructions to the new stack to determine if any faults occur (block 640). For example, in an implementation described above in connection with FIG. 4, guest page table 410 may receive query 435, and may identify, in guest page table 410, writable pages 440 provided around new stack 420. Writable pages 440 may include a number of pages that are safe to reference (e.g., may be mapped) before and after new stack 420, and information associated with the pages that are safe to reference. Guest page table 410 may provide writable pages 440 to pre-fetch cache 405, and pre-fetch cache 405 may receive writable pages 440. If writable pages 440 can be mapped before and after new stack 420, pre-fetch cache 405 may determine that writable pages 440 can be quickly and easily pre-fetched. Pre-fetch cache 405 may make this determination by referencing writable pages 440. Pre-fetch cache 405 may reference writable pages 440 by providing test instructions 445 to new stack 420 in order to determine whether any faults occur prior to switching to new stack 420.

Returning to FIG. 6, process 600 may include determining whether fault(s) occur due to the test instructions (block 650). If fault(s) occur (block 650—YES), process 600 may include adding, to the shadow page table, the writable pages provided around the new stack (block 660) and switching to the new stack (block 670). If fault(s) do not occur (block 650—NO), process 600 may include switching to the new stack (block 670). For example, in an implementation described above in connection with FIG. 4, if test instructions 445 return one or more faults 450 to pre-fetch cache 405, pre-fetch cache 405 may add, to shadow page table 415, writable pages 440 provided around new stack 420, as indicated by reference number 455. After writable pages 440 are added to shadow page table 415, pre-fetch cache 405 may switch from current stack 425 to new stack 420, as indicated by reference number 460. If test instructions 445 do not return one or more faults 450, pre-fetch cache 405 may switch from current stack 425 to new stack 420 without adding writable pages 440 to shadow page table 415.

Process block 620 may include the process blocks depicted in FIG. 7. As shown in FIG. 7, process block 620 may include modifying the guest operating system code, based on the instruction to switch to the new stack, to include instructions to generate the query (block 700), and executing the instructions to generate the query and provide the query to the guest page table (block 710). For example, in an implementation described above in connection with FIG. 4, pre-fetch cache 405 may insert instructions, in guest code 430, that cause guest code 430 to generate query 435 and to provide query 435 to guest page table 410. Pre-fetch cache 405 may execute the instructions in guest code 430 to generate query 435 and to provide query 435 to guest page table 410.

Systems and/or methods described herein may provide a hypervisor-based pre-fetch cache that enables a multiple page stack to be properly mapped to a shadow page table. For example, for a given stack address, the pre-fetch cache may return how many pages are safe to reference before and after a new stack pointer. The pre-fetch cache may not return an actual size of the stack, but may return information about whether pages before and after the new stack pointer are mappable. If the pages before and after the new stack pointer are mappable, the hypervisor may know that the pages may be quickly and easily pre-fetched.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a hypervisor associated with a device, guest operating system code that includes an instruction to switch from a current stack to a new stack,
      the current stack and the new stack being provided in hardware associated with the device;
   providing, by the hypervisor and to a guest page table associated with the hypervisor, a query for writable pages before or after a reference to the new stack;
   receiving, by the hypervisor associated with the device and from the guest page table, information identifying the writable pages,
      the information identifying the writable pages being received based on the query;
   providing, by the hypervisor associated with the device, test instructions, to reference the writable pages, to the new stack to determine whether one or more faults occur when the writable pages are referenced,
      the one or more faults occurring when the information identifying the writable pages has not been included in a shadow page table associated with the hypervisor; and
   switching, by the hypervisor associated with the device, from the current stack to the new stack when no faults occur based on the test instructions.

2. The method of claim 1, further comprising:
   adding, to the shadow page table associated with the hypervisor, the information identifying the writable pages when one or more faults occur based on the test instructions; and
   switching, from the current stack to the new stack, after adding the information identifying the writable pages to the shadow page table.

3. The method of claim 1, where the hypervisor includes a pre-fetch cache.

4. The method of claim 1, where the hardware includes one or more of:
   a processing unit associated with the device,
   a main memory associated with the device,
   a read only memory (ROM) associated with the device, or
   a storage device associated with the device.

5. The method of claim 1, where providing the query comprises:
   modifying the guest operating system code, based on the instruction to switch to the new stack, to include instructions to generate the query; and
   executing the instructions to generate the query and to provide the query to the guest page table.

6. The method of claim 1, where the test instructions include an x86 instruction.

7. The method of claim 1, where the test instructions reference pages associated with the new stack and return one or more faults when the referenced pages are not writable.

8. A device, comprising:
   one or more processors to cause a hypervisor to:
      receive guest operating system code that includes an instruction to switch from a current stack to a new stack,
         the current stack and the new stack being provided in hardware included in the device,
      provide, to a guest page table associated with the hypervisor, a query for a range of writable pages before or after a reference to the new stack,
      receive, from the guest page table, information identifying the range of writable pages,
         the information identifying the range of writable pages being received based on the query,
      provide test instructions, to reference pages in the range of writable pages, to the new stack to determine whether one or more faults occur when the pages are referenced,
         the one or more faults occurring when the information identifying the range of writable pages has not been included in a shadow page table associated with the hypervisor, and
      switch from the current stack to the new stack when no faults occur based on the test instructions.

9. The device of claim 8, where the hypervisor is further to:
   add, to the shadow page table associated with the hypervisor, the information identifying the range of writable pages when one or more faults occur based on the test instructions, and
   switch, from the current stack to the new stack, after adding the information identifying the range of writable pages to the shadow page table.

10. The device of claim 8, where the hypervisor includes a pre-fetch cache.

11. The device of claim 8, where, when providing the query, the hypervisor is further to:
   modify the guest operating system code, based on the instruction to switch to the new stack, to include instructions to generate the query, and execute the instructions to generate the query and to provide the query to the guest page table.

12. The device of claim 8, where the test instructions include an x86 instruction.

13. The device of claim 8, where the test instructions reference pages associated with the new stack and return one or more faults when the referenced pages are not writable.

14. A non-transitory computer-readable medium storing instructions, the instructions comprising:
one or more instructions that, when executed by a hypervisor associated with a device, cause the hypervisor to:
receive, by the hypervisor, guest operating system code that includes an instruction to switch from a current stack to a new stack,
the current stack and the new stack being provided in hardware of the device,
provide, by the hypervisor and to a guest page table associated with the hypervisor, a query for a range of writable pages before or after a reference to the new stack,
receive, by the hypervisor and from the guest page table, information identifying the range of writable pages,
the information identifying the range of writable pages being received based on the query,
provide, by the hypervisor, test instructions, to reference pages in the range of writable pages, to the new stack to determine whether one or more faults occur when the pages are referenced,
the one or more faults occurring when the information identifying the range of writable pages has not been included in a shadow page table associated with the hypervisor, and
switch, by the hypervisor, from the current stack to the new stack when no faults occur based on the test instructions.

15. The non-transitory computer-readable medium of claim 14, the instructions further comprising:
one or more instructions that, when executed by the at least one processor, cause the at least processor to:
add, to the shadow page table associated with the hypervisor, the information identifying the range of writable pages when one or more faults occur based on the test instructions, and
switch from the current stack to the new stack after adding the information identifying the range of writable pages to the shadow page table.

16. The non-transitory computer-readable medium of claim 14, where the hypervisor includes a pre-fetch cache.

17. The non-transitory computer-readable medium of claim 14, the instructions further comprising:
one or more instructions that, when executed by the at least one processor, cause the at least processor to:
modify the guest operating system code, based on the instruction to switch to the new stack, to include instructions to generate the query, and
execute the instructions to generate the query and to provide the query to the guest page table.

18. The non-transitory computer-readable medium of claim 14, where the test instructions include an x86 instruction.

19. The non-transitory computer-readable medium of claim 14, where the test instructions reference pages associated with the new stack and return one or more faults when the referenced pages are not writable.

20. The non-transitory computer-readable medium of claim 14, where the guest operating system code includes:
instructions to perform operations using the current stack,
instructions to switch to the new stack, and
instructions to perform operations using the new stack.

* * * * *